(12) United States Patent  (10) Patent No.: US 8,503,576 B2
Mehrmanesh et al.  (45) Date of Patent: Aug. 6, 2013

(54) MIRROR SIGNAL IQ-IMBALANCE CORRECTION

(75) Inventors: Saeid Mehrmanesh, San Jose, CA (US); Vahid Mesgarpour Toosi, Mountain View, CA (US); Mahdi Khoshgard, San Jose, CA (US)

(73) Assignee: SiTune Corporation, San Jose, CA (US)

( * ) Notice: Subject to any disclaimer, the term of this patent is extended or adjusted under 35 U.S.C. 154(b) by 214 days.

(21) Appl. No.: 13/093,145

(22) Filed: Apr. 25, 2011

(65) Prior Publication Data

US 2012/0269245 A1  Oct. 25, 2012

(51) Int. Cl.
*H03D 3/22* (2006.01)
(52) U.S. Cl.
USPC ........... 375/332; 375/238; 375/239; 375/242; 375/256; 375/257; 375/286; 375/353
(58) Field of Classification Search
USPC ................. 375/224, 332, 238, 239, 242, 256, 375/257, 286, 353; 370/203, 204, 205, 208, 370/209, 210; 455/130
See application file for complete search history.

(56) References Cited

U.S. PATENT DOCUMENTS 7,925,217 B2 * 4/2011 Park et al. .................. 455/67.11
2006/0198475 A1 * 9/2006 Wu et al. ....................... 375/346

OTHER PUBLICATIONS

Jack Glas, "Digital I/Q Imbalance Compensation in a Low-IF receivers" 1998 IEEE.*

* cited by examiner

*Primary Examiner* — Dhaval Patel
(74) *Attorney, Agent, or Firm* — Novak Druce Connolly Bove + Quigg LLP

(57) ABSTRACT

A system and method are provided for calibrating the IQ-imbalance in a low-IF receiver. A Test Signal can be generated in a mirror frequency and conveyed to the receiver. The power of the signal produced in the receiver from the conveyed Test Signal can be measured. In the absence of an IQ-imbalance, the Test Signal can be completely eliminated in the receiver and the corresponding measured power of the produced signal can be minimized. Accordingly, a two dimensional algorithm is described for calibrating a receiver and correcting the IQ-imbalance by adjusting the phase and gain difference between the I and Q channels in the receiver based on the measured power of the signal produced in the receiver.

16 Claims, 9 Drawing Sheets

MIRROR SIGNAL IQ-IMBALANCE CORRECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of telecommunications, and more specifically to correcting the IQ-imbalance in receivers that generate in-phase (I) and quadrature-phase (Q) signals from an incoming carrier signal in such systems.

BACKGROUND

In recent decades, among the most rapid technological advances have taken place in the field of telecommunications. As consumers continue to carry out more and more of their daily life's functions on mobile devices, manufacturers are increasingly challenged to produce more efficient, reliable, and faster systems capable of higher throughput. In addition, the devices are expected to perform in sub-optimal conditions such as in varying temperatures, in moving vehicles, and with highly distorted and attenuated signals, while conserving power and being as cost-efficient to build as possible.

Generally, mobile telecommunications devices receive a carrier-frequency signal that is processed in the receiver before information can be extracted from the signal. To achieve high performance and stability, the receiver has to function with accuracy and consistency under various conditions, such as changing temperatures, and across different channels. However, because the performance of receivers can be highly sensitive to such factors, the problem of achieving consistently high performance can be challenging. What is needed is a system and method for accurately and efficiently calibrating a receiver for optimal performance in various conditions. As will be demonstrated, this invention meets this need in an elegant manner.

DETAILED DESCRIPTION

In the following description, numerous specific details are set forth in order to provide a thorough understanding of the present invention. However, it wilt be apparent to one skilled in the art that the present invention can be practiced without these specific details. In other instances, well known circuits, components, algorithms, and processes have not been shown in detail or have been illustrated in schematic or block diagram form in order not to obscure the present invention in unnecessary detail. Additionally, for the most part, details concerning communications systems, transmitters, receivers, communications devices and the like, have been omitted inasmuch as such details are not considered necessary to obtain a complete understanding of the present invention and are considered to be within the understanding of persons of ordinary skill in the relevant art. It is further noted that, where feasible, all functions described herein may be performed in either hardware, software, firmware, analog components or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ."

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
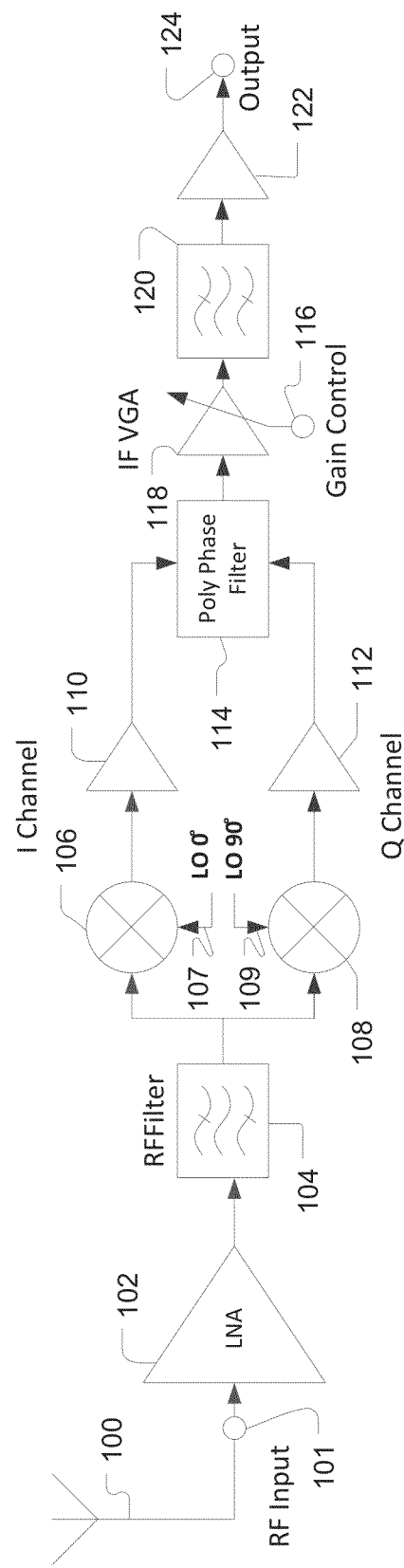
FIG. 1 shows an example of a RF receiver in accordance with various embodiments.

In various embodiments, systems and methods are described for correcting an in-phase (I) and quadrature-phase (Q) imbalance, otherwise known as an "IQ imbalance," in a low intermediate frequency (low-IF) receiver. FIG. 1 illustrates an example of a structure of a typical low-IF receiver. A radio frequency (RF) signal, or a carrier signal, can be received at an antenna 100 and conveyed to the receiver input (RF input) 101. The signal can be conveyed to a low noise amplifier (LNA) 102 and to a radio frequency filter (RF Filter) 104. After the RF Filter 104, the signal can be separated into two channels, an in-phase (I) Channel and a quadrature-phase (Q) Channel. On the I Channel, the signal can be conveyed to a mixer 106, where the signal can be mixed with a zero-degree phase signal from a local oscillator (LO 0°) 107 and the produced signal can be conveyed to an amplifier 110. On the Q Channel, the signal can be conveyed to a mixer 108, where the signal can be mixed with a ninety-degree phase signal from a local oscillator (LO 90°) 109 and the produced signal can be conveyed to an amplifier 112. The I Channel and the Q Channel can then be conveyed to a Poly Phase Filter 114, to an Intermediate Frequency Variable Gain Amplifier (IF VGA) 118, which can have a level of amplification that is controlled by a control signal (Gain Control) 116, to a filter 120, to an amplifier 122, and to the receiver output (Output) 124.

In the ideal case, both the signal produced on the I Channel and the signal produced on the Q Channel will have the same voltage gain and a 90 degree difference in phase. If the produced I signal and the produced Q signal have different gain, then a gain imbalance is present, if the phase difference between the produced I signal and the produced Q signal is smaller or larger than 90 degrees, then a phase imbalance is present. Presence of either a gain imbalance or a phase imbalance is referred to as an IQ imbalance. Various factors can contribute to an IQ imbalance in a receiver, including a phase mismatch between LO signals 107, 109, gain and delay or phase mismatch in mixers 106, 108, gain mismatch in amplifiers 110, 112, and mismatches in the components of a Poly Phase Filter 114.

Implementing low-IF topology in radio frequency (RF) receivers has several advantages. For example, low-IF topology supports DC-frequency and can reduce the size and power consumption of an RF receiver. However, a drawback of low-if receivers is a tendency towards mismatch in gain and phase between the I and Q channels; in other words, the IQ imbalance. In most low-IF receivers, a multi-channel topology and at least one Saw-filter are used to reduce the IQ-imbalance problem. However, such topologies can be large in size, expensive to produce, and can consume a lot of power. In various embodiments, systems and methods are described to correct the IQ-imbalance effect on the SNR performance in low-IF receivers by estimating the IQ-imbalance and compensating it by adjusting the gain and phase mismatch between the "I" and "Q" path.

Figure 2:
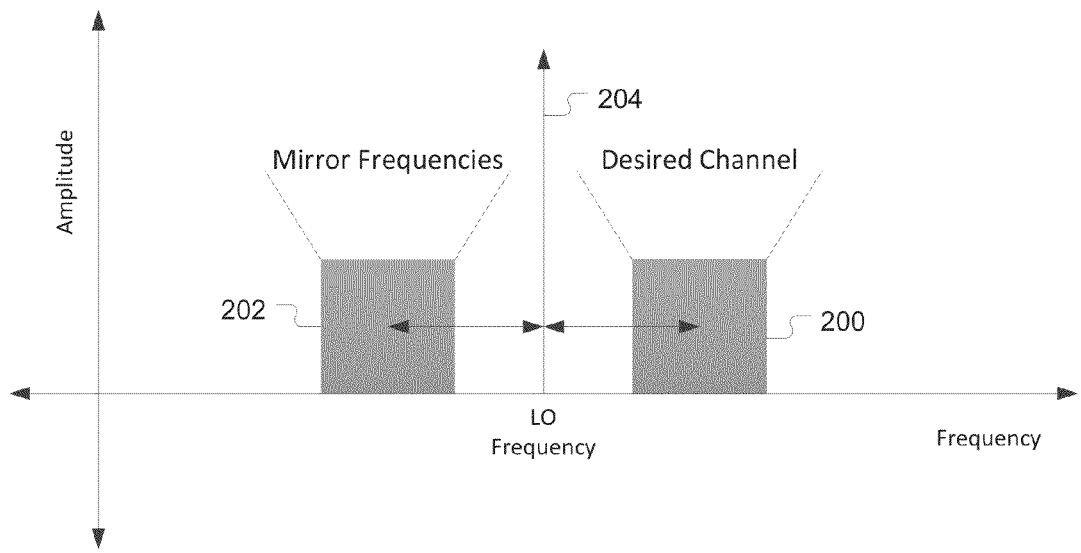
FIG. 2 illustrates an example of a mirror frequency signal, in accordance with various embodiments.

Further, when a signal in a mirror frequency is conveyed to a low-IF receiver, an IQ imbalance can decrease the signal to noise ratio (SNR) performance of the receiver. FIG. 2 illustrates an example of a mirror frequency signal, in accordance with various embodiments. As illustrated in the example of the figure, mirror frequency signals 202 can be a reflection of the desired channel 200 over the local oscillator frequency (LO Frequency) 204. For example, if a desired channel is 500 MHz to 600 MHz and the LO Frequency is at 400 MHz, mirror frequency signals will be 100 MHz (400 MHz–(600 MHz–400 MHz)) to 300 MHz (400 MHz–(500 MHz–400 MHz)) signals. In the presence of a signal in a mirror frequency, an IQ imbalance can cause undesired mirror signal folding to the desired channel, decreasing the in-band signal to noise ratio (SNR) and creating an adjacent channel performance shortage. When there is not an IQ imbalance, all signals in mirror frequencies can be filtered out.

In various embodiments, mirror frequency signals can be used to calibrate a low-IF receiver to compensate for an IQ imbalance. Namely, a Test Signal, which Test Signal can be a mirror frequency signal for a desired channel, can be generated in an oscillator and conveyed to the receiver. The power of the signal produced in the receiver can be measured to determine if the Test Signal has been filtered out. If the Test Signal has not been filtered out, then the phase and/or gain of the I and/or Q channel in the receiver can be changed to adjust the IQ imbalance. The power of the signal produced in the receiver from the Test Signal can then be measured again and the process can continue until the power of the signal produced in the receiver from the Test Signal is minimized and the IQ imbalance has, accordingly, been corrected. The generated Test Signal can be a single tone signal in a mirror frequency. In various embodiments, calibration of a receiver can be performed for any desired channel. Namely, different channels can have different optimal calibration settings in a receiver, hence, calibration can be performed for each channel. For example, the device can be calibrated when a new channel is selected in the receiver. In various embodiments, the device can be calibrated periodically. In other embodiments, the device can be calibrated whenever poor performance is detected.

In this specification, "gain imbalance" refers to the difference in gain between the and the Q channels. In the absence of a gain imbalance, the I and the Q channel are of equal gain. Accordingly, "adjusting" a gain imbalance refers to changing the gain by either increasing or decreasing the gain of the I and/or the Q channel such that the gain difference between the channels is changed.

In this specification, "phase imbalance" refers to the difference in phase between the I and the Q channels. In the absence of a phase imbalance, the I and the Q channel are perfectly 90 degrees out of phase. Ac "adjusting" a gain imbalance refers to changing the phase by either increasing or decreasing the phase of the I and/or the Q channel such that the phase difference between the channels is changed.

Figure 3:
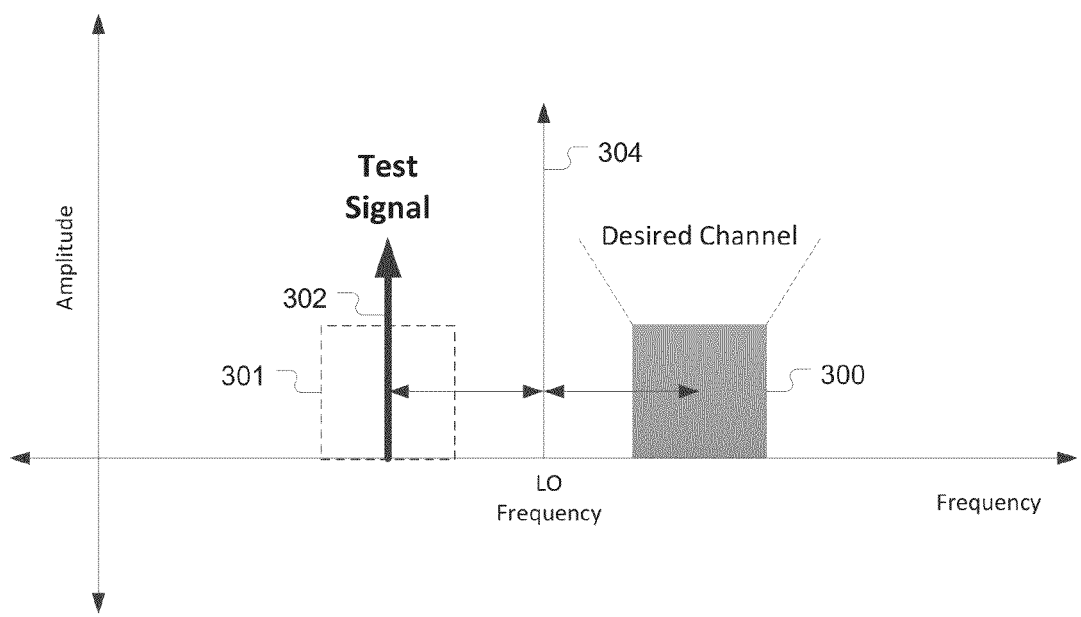
FIG. 3 illustrates an example of a single tone mirror frequency Test Signal, in accordance with various embodiments.

FIG. 3 illustrates an example of a single tone mirror frequency Test Signal, in accordance with various embodiments. As illustrated in the example of FIG. 3, a Test Signal 302 can be a single tone signal within the range of mirror frequencies 301 of the desired channel 300 as reflected over the local oscillator frequency (LO Frequency) 304. For example, if a desired channel is 500 MHz to 600 MHz and the LO Frequency is at 400 MHz, a Test Signal can be any signal in the 100 MHz (400 MHz–(600 MHz–400 MHz)) to 300 MHz (400 MHz–(500 MHz–400 MHz)) range. Ideally, however, the Test Signal will closer to the middle of the mirror frequency range.

Figure 4:
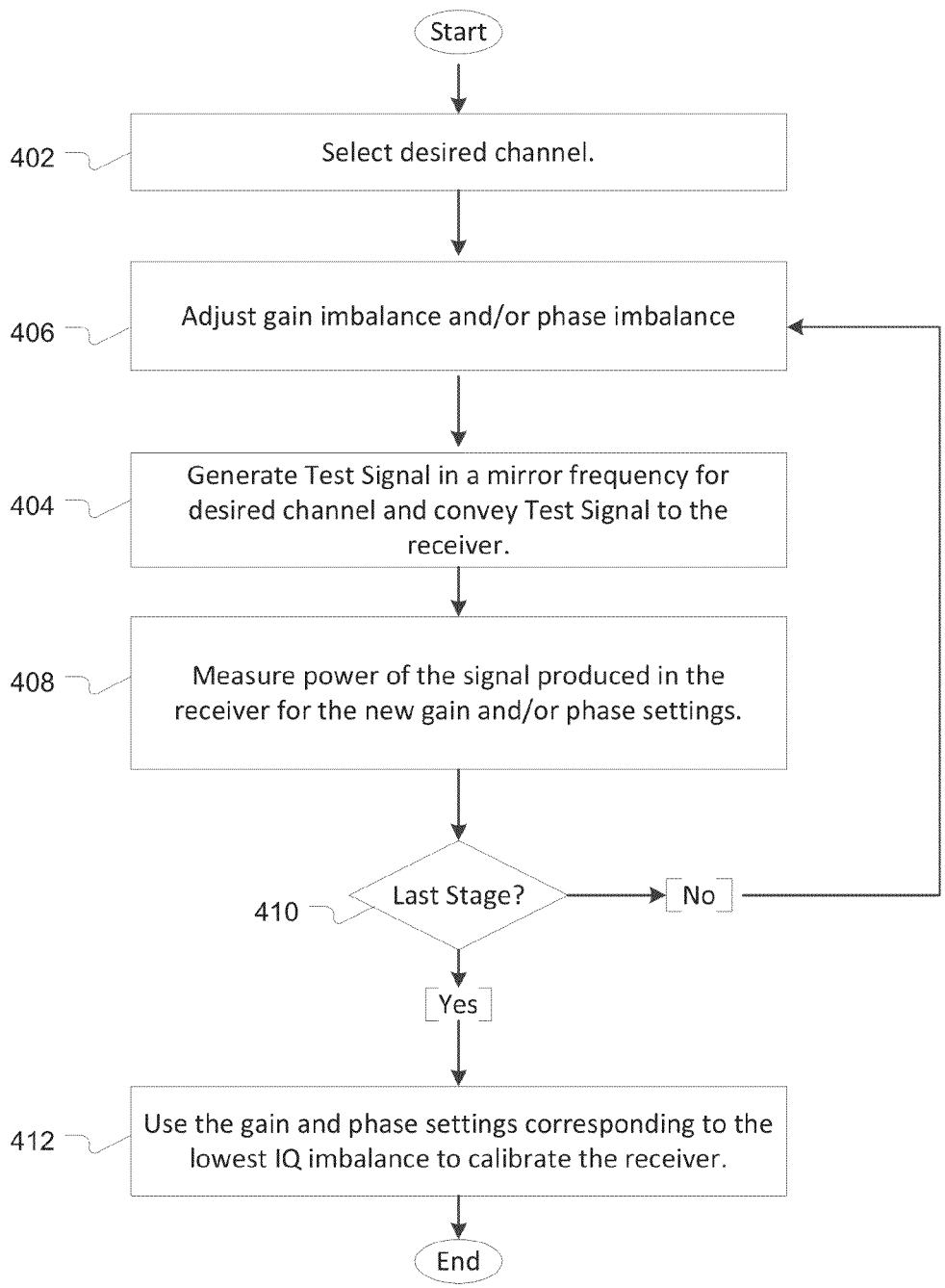
FIG. 4 is a flow diagram of an example calibration process in a low-IF receiver in accordance with various embodiments.

FIG. 4 is a flow diagram of an example calibration process in a low-IF receiver in accordance with various embodiments. A desired channel can be selected 402 in the receiver. The gain imbalance and/or phase imbalance can be adjusted 406. The adjusting of the gain imbalance and/or phase imbalance 406 can be performed, for example, according to predetermined procedures and decisions contained in the device's circuits or digital logic. For example, the gain of the I or the Q channel can be increased or decreased or the phase shift of the I or the Q channel can be increased or decreased. A Test Signal in a mirror frequency can be generated for the desired channel and conveyed to the receiver 404. The power of the signal produced in the receiver for the new gain and/or phase settings can then be measured 408. A decision can be made as to whether the last stage of the calibration process has been reached 410; for example, whether the last stage has been reached can be indicated by predetermined algorithms, procedures, and executable logic contained in the device's circuits or digital logic. If the last stage has not been reached, then the gain imbalance and/or phase imbalance can be adjusted 406 and the process can repeat. If the last stage has been reached, then the gain and phase settings corresponding to the lowest measured signal power and accordingly corresponding to the lowest IQ imbalance can be used to calibrate the receiver 412. Namely, the gain and phase adjustment values corresponding to the settings with the lowest Observed IQ imbalance or the lowest measured power of the produced signal can be used in operating the receiver under the desired channel. The adjusting of the gain imbalance and/or phase imbalance 406 can be performed according to various algorithms, procedures, or executable logic. For example, in one embodiment, the phase and gain can be adjusted 406 in predetermined increments, such as by increasing the gain by a certain number of decibels at a time on the I channel and increasing the phase by a certain number of degrees at a time on the I channel. The power of the signal produced in the receiver can be measured 408 between each adjustment and a decision 410 that the last stage of the procedure has been reached can be made when, for example, all of a predetermined set of adjustment have been performed and the corresponding signal power has been measured, or when the measured signal power is below a predetermined threshold, indicating that the IQ imbalance has been sufficiently corrected. In various embodiments, feedback loops can be implemented to change the gain and phase while observing the power of the signal produced in the receiver to determine ideals gain and phase settings. Further methods for adjusting the gain and phase 406 and deciding 410 to use certain values of gain and phase will be discussed further below.

Figure 5:
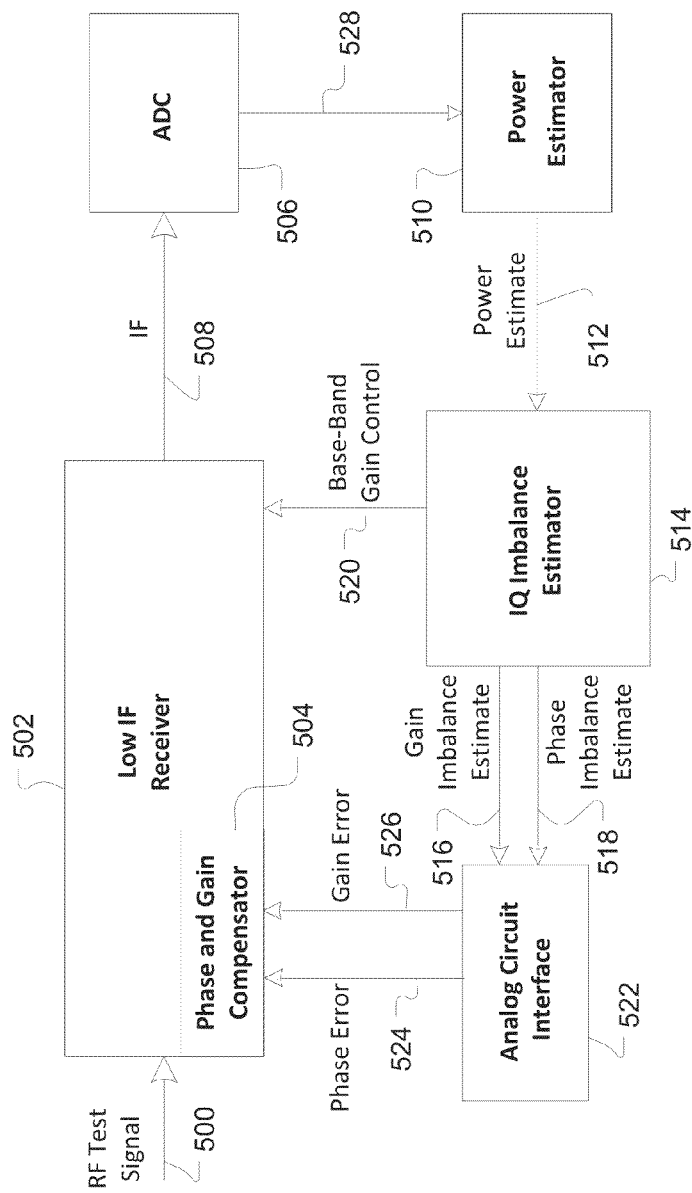
FIG. 5 illustrates an example of a low-IF receiver with a calibration mechanism, in accordance with various embodiments.

FIG. 5 illustrates an example of a low-IF receiver with a calibration mechanism, in accordance with various embodiments. A Test Signal (RF Test Signal) 500 can be conveyed to a receiver (Low IF Receiver) 502. Such a Test Signal 500 can be generated in an oscillator. The signal can be a single tone signal in a mirror frequency for the desired channel to which the receiver is tuned. A phase and gain compensator 504 can adjust a gain imbalance and a phase imbalance in the receiver 502 by adjusting the gain difference and/or the phase difference between the I and the Q channels. An intermediate frequency signal (IF) 508 produced in the receiver 502 can be conveyed to an analog to digital converted (ADC) 506 for conversion to the digital domain. The digital signal 528 can be conveyed to a power estimator 510, where the signal's 528 power can be measured, and the power estimate (Power Estimate) 512 can be conveyed to an IQ Imbalance Estimator 514, where, based on the measured signal power 512 and according to executable logic in the IQ Imbalance Estimator 514, a gain imbalance estimate (Gain Imbalance Estimate) 516 and a phase imbalance estimate (Phase Imbalance Estimate) 518 can be generated and conveyed to an analog circuit interface (Analog Circuit Interface) 522, where the gain imbalance estimate 516 and the phase imbalance estimate 518 can be converted to the analog domain. The analog phase error (Phase Error) 524 and the analog gain error (Gain Error) 526 can be conveyed to the Phase and Gain Compensator 504. The Phase and Gain Compensator 504 can adjust the phase imbalance and gain imbalance in the receiver according to the receiver Phase Error 524 and Gain Error 526. A base-band gain control signal (Base-Band Gain Control) 520 can be generated in the IQ Imbalance Estimator 514 according to executable logic in the IQ Imbalance Estimator 514 and conveyed the receiver. The base-band gain control signal 520 can adjust the gain in the base-band section by, for example, adjusting a gain in a variable gain amplifier in the base-band section of the receiver 502. In an embodiment, the base-band gain can be increased as the power of the signal produced in the receiver 508 decreases to increase the power estimate 512 and thereby allow more precise calibration of the system.

Thus, in the example of FIG. 5, if the receiver 502 does not exhibit an IQ imbalance, then all mirror frequencies and, accordingly, the entire Test Signal 500 will be eliminated and the Power Estimate 512 will be minimal. Conversely, in the presence of an IQ imbalance, some of the Test Signal can appear after the receiver 502. Hence, by minimizing the Power Estimate 512 through adjusting the gain imbalance and the phase imbalance, the system can be calibrated to correct the IQ imbalance. Accordingly, various algorithms can be implemented in the system and in the IQ Imbalance Estimator 514 to calibrate the system.

In an embodiment, a Power Estimate 512 can be measured for a first set of phase imbalance and gain imbalance value combinations. A first ideal combination producing the lowest Power Estimate 512 can be selected out of the first set of combinations and a second, more precise, set of phase imbalance and gain imbalance value combinations can be selected based on the first ideal combination. A Power Estimate 512 can be measured for the second set of phase imbalance and gain imbalance value combinations and a second ideal combination can be similarly selected. The process can continue with a more accurate ideal combination of gain and phase imbalance values being derived in each iteration. Because gain imbalance and phase imbalance can be inter-related, such a process where combinations of phase imbalance and gain imbalance are tested or simultaneously varied can provide more accurate or faster calibration.

In various embodiments, the gain imbalance and the phase imbalance can be adjusted in a feedback loop based on the Power Estimate 512. For example, the gain imbalance can be adjusted in steps of predetermined increments and the Power Estimate 512 can be measured between each step, the gain adjustment at minimal Power Estimate 512 can correspond to the least gain imbalance. For example, the gain on the I Channel can be changed in steps of a certain number of decibels and the Power Estimate 512 can be measured between each step. If the Power Estimate 512 increases then the gain can be changed in the opposite direction. The adjustment can continue in the direction of decreasing Power Estimate 512 until the Power Estimate 512 starts to increase, the gain adjustment corresponding to the lowest Power Estimate 512 can correspond to the point of least gain imbalance. A similar feedback control system can be implemented to adjust the phase imbalance. Further, because the phase imbalance and the gain imbalance can be interrelated, the system can be configured to switch between calibrating the gain and the phase while using the best estimated gain or phase adjustment value for the non-varied variable. For example, after finding a first initial optimal gain adjustment value, that value can be used while finding an initial optimal phase adjustment value. After finding the initial optimal phase adjustment value, a second optimal gain adjustment value can be estimated while using the first initial optimal phase adjustment value in the receiver. In an embodiment, a feedback loop can be incorporated where both the phase imbalance and the gain imbalance are simultaneously adjusted while the Power Estimate 512 is monitored to determine the ideal gain and phase adjustments. In another embodiment, the calibration can be performed by selecting a range of gain or phase adjustments and measuring the Power Estimate 512 at predetermined increments on the range. For example, the gain adjustment corresponding to the lowest Power Estimate 512 can correspond to the adjustment with the lowest respective gain imbalance. Similarly, the phase adjustment corresponding to the lowest Power Estimate 512 can correspond to the adjustment with the lowest respective phase imbalance. After finding an initial gain adjustment value, the gain can again be tested for finer tuning on a smaller range of values, which range of values can be selected around the initial gain adjustment value and where the gain will be tested between increments of adjustment. Similarly, finer tuning of the phase adjustment can be performed. In another embodiment, as will be described in further detail below, the gain and phase can be tested on a two-dimensional space, wherein the gain adjustment values are on one axis and phase adjustment values are on the other axis, where the Power Estimate 512 can be measured for a series of points in the two-dimensional space to find an optimal gain and phase imbalance adjustment value.

Figure 6:
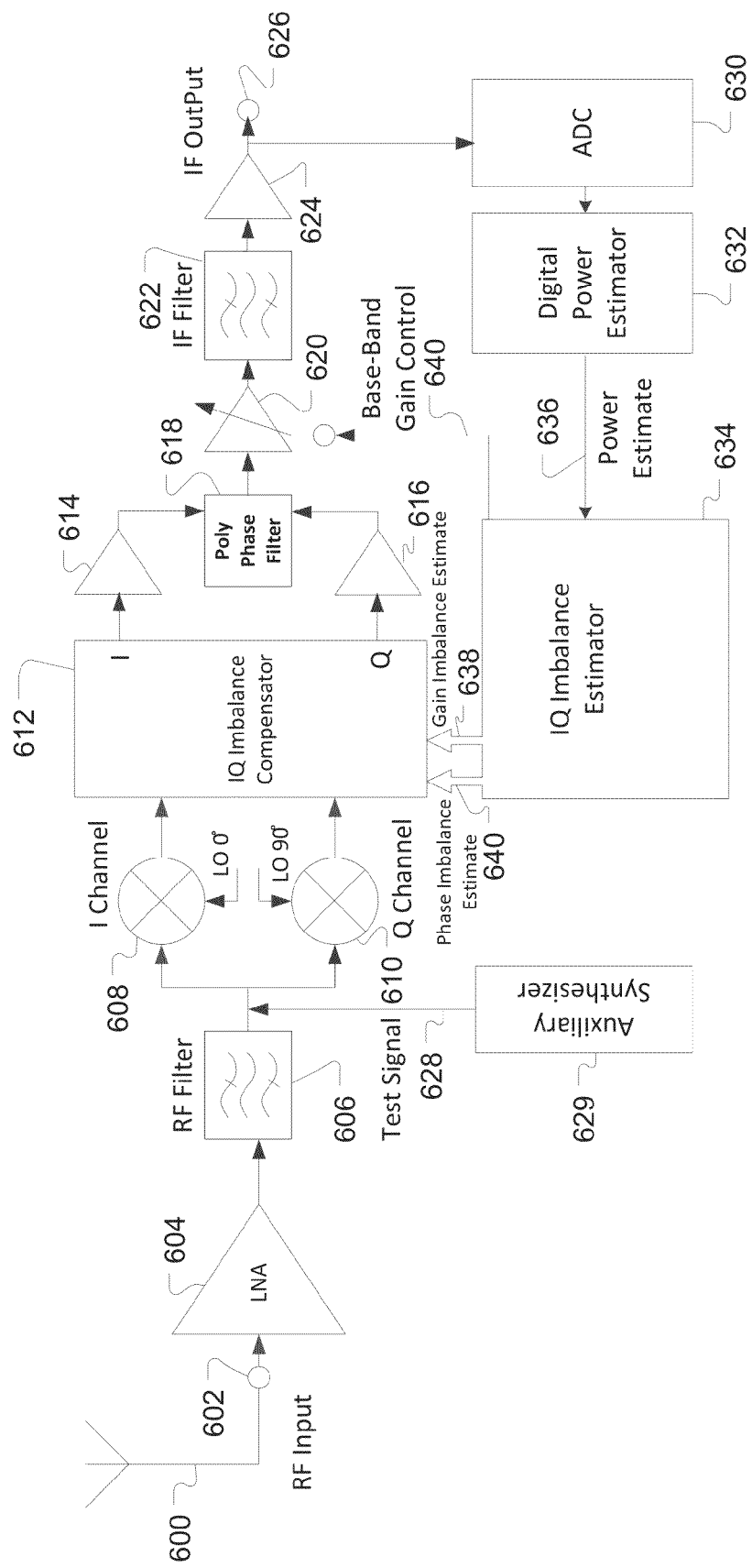
FIG. 6 illustrates a further example of a low-IF receiver with a calibration system, in accordance with various embodiments.

FIG. 6 illustrates a further example of a low-IF receiver with a calibration system, in accordance with various embodiments. An RF signal can be received at an antenna 600 and conveyed to an RF Input 602. The signal can be conveyed to a low noise amplifier (LNA) 604 to be amplified and the amplified signal can be conveyed to a radio frequency filter (RF Filter) 606 for filtering. After the RF Filter 606, the signal can be conveyed down two channels, an I Channel and a Q Channel. On the I Channel, the signal can be conveyed to a mixer 608, where the signal can be mixed with a 0 degree phase signal from a local oscillator (LO 0°) signal. On the Q Channel, the signal can be conveyed to a mixer 610, where the signal can be mixed with a 90 degree phase signal from a local oscillator (LO 90°) signal. After the mixers 608, 610, the signals can be conveyed to an IQ Imbalance Compensator 612, where the phase imbalance and gain imbalance can be compensated by adjusting the gain difference and the phase difference between the I Channel and the Q Channel. The signal on the I Channel can be conveyed to an amplifier 614 and to a Poly Phase Filter 618. The signal on the Q Channel can be conveyed to an amplifier 616 and to the Poly Phase Filter 618 where the I Channel and the Q Channel can be combined into one intermediate frequency signal. The signal can be conveyed to a variable gain amplifier 620 and to an intermediate frequency filter (IF Filter) 622. The signal can be amplified in an amplifier 624 and conveyed to the receiver output 626. To calibrate the IQ imbalance on the system described in FIG. 6, the RF Input path can be turned off to prevent any outside signals from entering the system and a Test Signal 628 can be conveyed to the mixers 608, 610. In various embodiments, the calibration can be performed when a channel is switched. In various embodiments, calibration can be performed when performance is poor. The Test Signal can be generated by an Auxiliary Synthesizer 629. In an embodiment, the Auxiliary Synthesizer 629 is a low cost ring oscillator synthesizer. In various embodiments, the Auxiliary Synthesizer 629 can be a synthesizer in addition to the high performance synthesizer generally present in receiver chips to generate signals used in the mixer. In other embodiments, the Auxiliary Synthesizer 629 can be a synthesizer already available on the chip to perform other functions. In various embodiments, an Auxiliary Synthesizer 629 without tight specifications, such as a synthesizer with high phase noise, frequency offset, and drift can be implemented because the design can tolerate such conditions. The Test Signal 628 can be a mirror frequency signal, such as a single tone signal located in the mirror frequencies for the desired channel, as described above. The Test Signal 628 can be separated into two channels, an I Channel and a Q Channel. On the I Channel, the signal can be conveyed to the mixer 608, where the signal can be mixed with a 0 degree phase signal from a local oscillator)(LO 0°) signal. On the Q Channel, the signal can be conveyed to the mixer 610, where the signal can be mixed with a 90 degree phase signal from a local oscillator (LO 90°) signal. After the mixers 608, 610, the signals can be conveyed to the IQ Imbalance Compensator 612, where the phase imbalance and gain imbalance can be compensated by adjusting the gain difference and the phase difference between the I Channel and the Q Channel. The signal on the I Channel can be conveyed to the amplifier 614 and to the Poly Phase Filter 618. The signal on the Q Channel can be conveyed to the amplifier 616 and to the Poly Phase Filter 618. The I Channel and the Q Channel can be combined into one intermediate frequency signal in the Poly Phase Filter 618. The signal can be conveyed to the variable gain amplifier 620 and to the intermediate frequency filter (IF Filter) 622. The signal can be amplified in the amplifier 624 and conveyed to an analog to digital converter (ADC) 630 where it can be converted to the digital domain. In various embodiments, the ADC 630 could be Pipeline, flash, or any other type of ADC. The specification on the ADC can be broad. In various embodiments, the ADC resolution could be low, such as less than 8 bits; because of the digital filtering and the feedback loops, the ADC is easier to design than a typical ADC with 8-12 bits. While a faster ADC with higher number of bits can perform better, in various embodiments, a simple ADC could work because there is little pressure on the ADC specifications. The digital signal can be conveyed to a Digital Power Estimator 632, where a Power Estimate 636 of the signal can be measured and conveyed to an IQ Imbalance Estimator 634. In the IQ Imbalance Estimator 634, a digital gain imbalance estimate signal (Gain Imbalance Estimate) 638 and a digital phase imbalance estimate signal (Phase Imbalance Estimate) 640 can be produced based on Power Estimates 636 according to algorithms in digital circuits. A Base-Band Gain Control Signal 640 can be produced in the IQ Imbalance Estimator according to algorithms in digital circuits to adjust the power in the variable gain amplifier 620. The Gain Imbalance Estimate 638 and the Phase Imbalance Estimate 640 can be conveyed to the IQ Imbalance Compensator 612. In the IQ Imbalance Estimator 634, an analog circuit can compensate the phase imbalance and gain imbalance in the receiver based on the Gain Imbalance Estimate 638 and Phase Imbalance Estimate 640. This analog circuit will be described in more detail below.

In various embodiments, if the example of the system illustrated in FIG. 6 does not exhibit an IQ imbalance, all of the Test Signal 628 can be gone after the Poly Phase Filter 618. In the presence of a gain and/or a phase imbalance, some of the Test Signal 628 can remain after the Poly Phase Filter 618. Accordingly, when the Power Estimate 636 is at a minimum, the IQ imbalance in the system can also be at a minimum. Thus, various algorithms can be implemented in the digital circuits of the IQ Imbalance Estimator 634 to calibrate the system based on the Power Estimate 636. Namely, in various embodiments, such algorithms can adjust the gain imbalance and/or phase imbalance in the IQ Imbalance Compensator 612 while monitoring the Power Estimate 636 to find the gain imbalance and phase imbalance adjustments that produce the lowest Power Estimate 636 and the lowest corresponding IQ Imbalance. Further, such algorithms can vary the gain in the variable gain amplifier 620 to allow for finer tuning of the gain imbalance and phase imbalance when the Power Estimate 636 reaches low levels. Such algorithms were discussed in the context of FIG. 5 and further algorithms will be described in more detail below.

Figure 7:
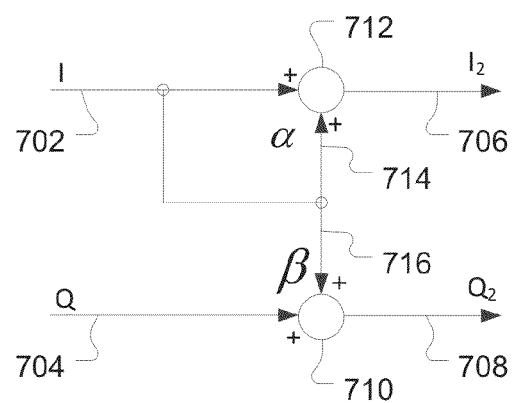
FIG. 7 illustrates an example of an IQ Imbalance Compensator, in accordance with various embodiments of the invention.

FIG. 7 illustrates an example of an IQ Imbalance Compensator, in accordance with various embodiments of the invention. Such an IQ imbalance Compensator can adjust the gain imbalance and the phase imbalance in a receiver based on a phase imbalance estimate ($\beta$) and a gain imbalance estimate ($\alpha$) supplied from an IQ Imbalance Estimator, such as the Phase imbalance Estimate 640 and the Gain imbalance Estimate 638 from the IQ Imbalance Estimator 634 of FIG. 6 or the Phase Error 524 and Gain Error 526 from the IQ imbalance Estimator 514 of FIG. 5. Such an IQ Imbalance Compensator can be implemented in the example system of FIG. 5 as the Phase and Gain Compensator 504 or in the example system of FIG. 6 as the IQ Imbalance Compensator 612. In various embodiments, an I Channel signal (I) 702 and a Q Channel signal 704 can be conveyed to the IQ Imbalance Estimator. The I Channel signal 702 can be separated into two paths. On one path, the I Channel signal can be conveyed to an adder 712; on a second path 714, the I Channel signal 702 can be multiplied by a Gain Imbalance Estimate ($\alpha$) and conveyed to the adder 712. In the adder 712, the I Channel signal 702 can be added to the product of the I Channel signal 702 and the Gain Imbalance Estimate ($\alpha$) to produce an adjusted I Channel signal ($I_2$) 706 such that $I_2=I+\alpha I$. On the Q path, the Q Channel signal (Q) 704 can be conveyed to an adder 710. On another path 716, the I Channel signal (I) 702 can be multiplied by a Phase Imbalance Estimate ($\beta$) and conveyed to the adder 710. In the adder 710, the Q Channel signal 702 can be added to the product of the I Channel signal 702 and the Phase Imbalance Estimate ($\beta$) to produce an adjusted Q Channel signal ($Q_2$) 708 such that $Q_2=Q+\beta I$. In various embodiments, $\alpha$ and $\beta$ could be either analog or digital signals. In a preferred embodiment, $\alpha$ and $\beta$ are real numbers but in other embodiments $\alpha$ and $\beta$ could be complex signals. In an embodiment, the circuit is able to apply frequency-dependent phase imbalance estimates and gain imbalance estimates.

In various embodiments, a two-dimensional search algorithm can be implemented in an IQ Imbalance Estimator to find optimum values of a Gain Imbalance Estimate and a Phase Imbalance Estimate. Such a two-dimensional algorithm can be implemented in digital circuits of an IQ Imbalance Estimator. For example, a two-dimensional search algorithm can be implemented in an IQ Imbalance Estimator 634 to find a Gain Imbalance Estimate 638 and a Phase Imbalance Estimate 640 as described in FIG. 6 or in an IQ Imbalance Estimator 514 to find a Gain imbalance Estimate 516 and a Phase Imbalance Estimate 518 as described in FIG. 5. In various embodiments, according to such a two-dimensional algorithm, Gain Imbalance values and Phase Imbalance values can be plotted in a two-dimensional space. Each axis can represent one parameter. For example, the horizontal axis can represent Gain Imbalance and the vertical axis can represent Phase Imbalance or vice versa. The range of Gain Imbalance values and Phase imbalance values can be chosen such that all possibly desirable Gain Imbalance values and Phase Imbalance values in the system can be plotted in the two-dimensional space. A series of grid-points can be plotted in the two-dimensional space at predetermined intervals. Each grid-point can represent a Gain imbalance value and a Phase Imbalance value corresponding to the coordinates of the grid-point. Accordingly, a Power Estimate can be obtained for each grid-point by setting a corresponding Gain Imbalance and Phase Imbalance for the grid-point in the receiver, conveying a Test Signal in a mirror frequency to the receiver, and measuring a Power Estimate of the signal produced in the receiver for each grid-point. For example, in the system of FIG. 6, a two-dimensional algorithm can be implemented in digital circuits of the IQ Imbalance Estimator 634. According to the algorithm, Gain imbalance values and Phase imbalance values can be plotted in a two-dimensional space. A series of grid-points can be plotted in the two-dimensional space at predetermined intervals. A Power Estimate can be obtained for each grid-point by conveying a Phase imbalance Estimate 640, which can be the phase coordinate of the grid-point, and a Gain Imbalance Estimate 638, which can be the gain coordinate of the grid-point, to the IQ Imbalance Compensator 612 and setting a corresponding Gain Imbalance adjustment and Phase Imbalance adjustment in the receiver. A Test Signal 628 in a mirror frequency can be generated in an Auxiliary Synthesizer 629, the Test Signal 628 can be conveyed to the receiver, a power of the signal produced in the receiver can be measured in the Digital Power Estimator 632, and the Power Estimate 636 can be conveyed to the IQ imbalance Estimator 634. The process can be repeated to find a Power Estimate 636 for each grid-point. Similarly, in various embodiments, this can be performed in a system as described in FIG. 5 and FIG. 6.

In various embodiments, a location of minimum Power Estimate and corresponding minimal IQ imbalance can be estimated based on the measured Power Estimates at the grid-points in the search space. In an embodiment, such minimum Power Estimate location can be the grid-point with the lowest measured Power Estimate. In another embodiment, such minimum Power Estimate location can be calculated based on the locations of various grid-points and their measured Power Estimates. Such a minimum Power Estimate location can provide the calibration settings for the receiver. Alternatively, such a location can be used to determine a subsequent searching region to obtain more refined calibration settings. For example, after determining a location of a minimum Power Estimate in a search space, the minimum Power Estimate location can be used as the center of a second searching region, which second searching region can cover a smaller range of Gain Imbalance values and Phase Imbalance values than the previous searching region. Further, grid-points in the second searching region can be placed at smaller gain intervals and smaller phase intervals to each other in order to produce more refined or accurate calibration settings. A second location of minimum Power Estimate and corresponding minimal IQ imbalance can be estimated in the second searching region based on measured Power Estimates at grid-points in the second searching region. Similarly, a third searching region covering a smaller search space with closer-placed grid-points centered on the location of the second minimum Power Estimate can be produced and the location of a third minimum Power Estimate can be found. Searching through subsequent stages can continue until a sufficiently fine estimate of the Gain Imbalance and Phase Imbalance is obtained or until the smallest possible search space has been implemented. In various embodiments, the gain in the baseband section can be increased in subsequent stages of the algorithm to maintain the power of the Power Estimate values in a certain range as the power of the signal produced in the receiver decreases due to decrease in overall IQ Imbalance in each subsequent searching stage. The gain can be increased, for example, by a Base-Band Gain. Control signal from an IQ Imbalance Estimator example as described in the context of FIG. 5 and FIG. 6

Figure 8:
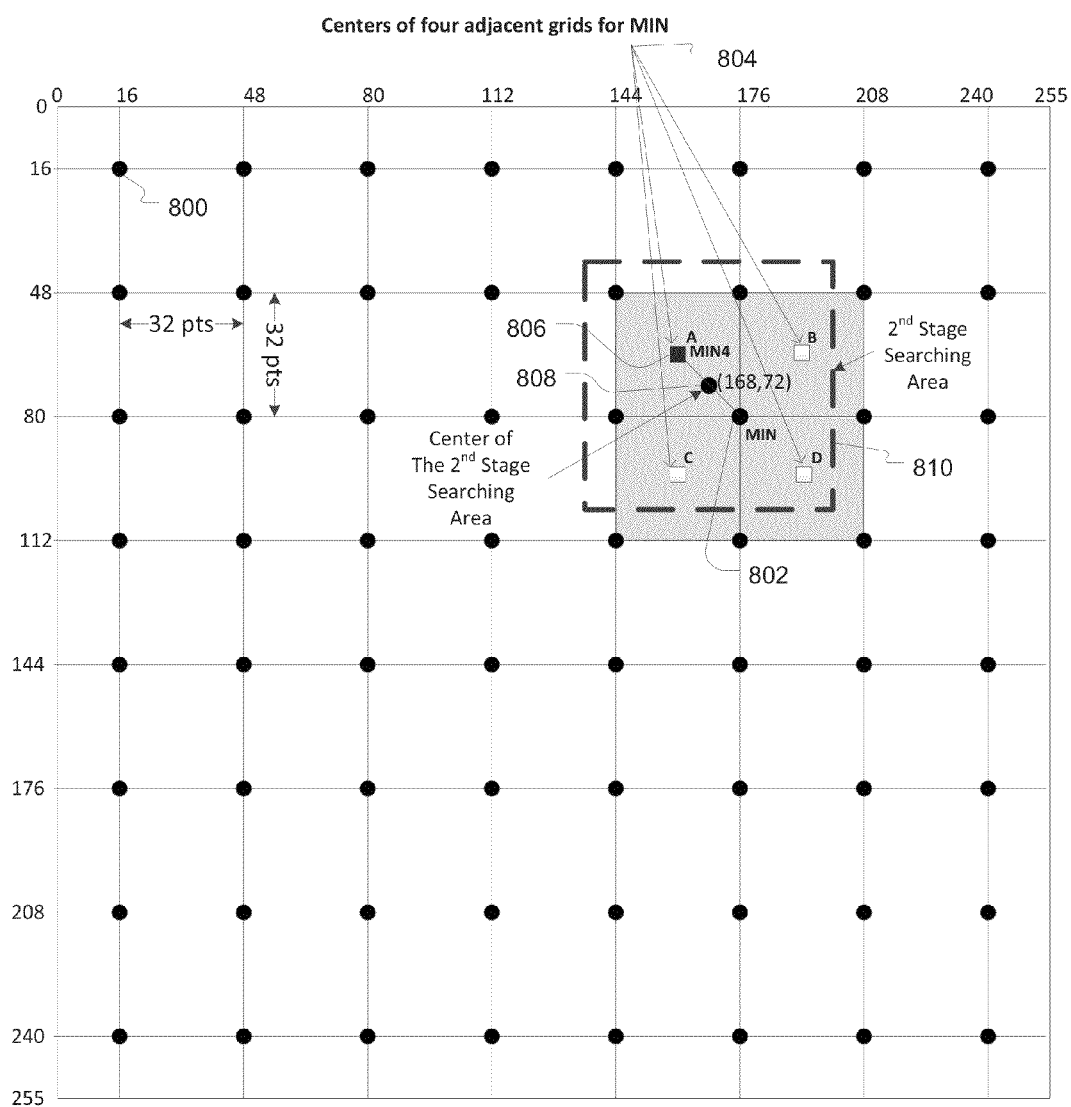
FIG. 8 illustrates a two-dimensional space representing Gain Imbalance and Phase Imbalance in a search algorithm, in accordance with various embodiments.

FIG. 8 illustrates a two-dimensional space representing Gain Imbalance and Phase Imbalance in a search algorithm, in accordance with various embodiments. As illustrated in the example of FIG. 8, Gain Imbalance values and Phase Imbalance values can be plotted in a two-dimensional space. Each axis can represent one parameter. For example, in FIG. 8, the horizontal axis can represent Gain Imbalance and the vertical axis can represent Phase Imbalance; in a different embodiment, the axis can be reversed. The range of Gain Imbalance values and Phase imbalance values can be chosen such that all possibly desired Gain. Imbalance values and Phase Imbalance values in the system can be plotted in the two-dimensional space. In the example of FIG. 8, the range of both the Gain Imbalance and the Phase Imbalance is 0 to 255 points, where a point is a unit of Gain adjustment or Phase adjustment. For example, in the parameters of the example illustrated in the figure, this range can cover all possibly desired values of Gain Imbalance adjustment and Phase Imbalance adjustment in the system that corresponds to the illustrated search space. A series of grid-points can be plotted in the two-dimensional space at predetermined intervals. In the example of FIG. 8, the search space is divided into 32 point by 32 point grids to produce an 8×8 array of grid-points such as the grid point 800. Each grid-point can represent a Gain Imbalance value and a Phase Imbalance value corresponding to the coordinates of the grid-point. Accordingly, a Power Estimate can be obtained for each grid-point by setting a corresponding Gain imbalance and Phase Imbalance for the grid-point in the receiver, conveying a Test Signal in a mirror frequency to the receiver, and measuring a Power Estimate of the signal produced in the receiver. For example, this can be performed in a system as described in FIG. 5 and FIG. 6.

In the example of FIG. 8, the Power Estimate can be obtained at each grid-point and compared to find the grid-point with the minimum Power Estimate. For example, in FIG. 8, a minimum Power Estimate grid-point (MIN) 802 at the coordinates (176, 80) can correspond to the lowest measured Power Estimate among the plotted grid-points. The coordinates of the MIN grid-point 802 can be saved and can be the first guess for the center of a next searching stage. The MIN grid-point 802 has four adjacent grids (shaded in gray); the centers of the four adjacent grids are labeled A, B, C, and D (Centers of four adjacent grids for MIN) 804. A prediction of the Power Estimate at the centers of the four grids A, B, C, and D 804 can be obtained by interpolating the Power Estimates at the four grid-points on the corners of each grid. For example, the Power Estimates at the four corner grid-points of each of the four adjacent grids can be averaged to obtain a prediction of the Power Estimate value for each center point A, B, C, and D 804. Namely, a prediction of the Power Estimate at the center point A 806 can be obtained by averaging the Power Estimates at the grid-points located at (144, 48), (176,48), (176,80), and (144,80). The predicted Power Estimates at the center points A, B, C, and D 804 can be compared and the coordinates of the center point with lowest predicted Power Estimate can be saved as the second guess for the center of the next searching stage, we can call this point MIN4. For example, in the example of FIG. 8, the center point with the lowest predicted Power Estimate of the center points A, B, C, and D 804 can be the point A (MIN4) 806. Further, the coordinates of MIN 802 and the coordinates of MIN4 806 can be averaged and the resulting location 808, in this case at the coordinates (168,72), can be used as the center of the $2^{nd}$ Stage Searching Area 810. The second stage searching area 810 can be an area that is twice the grid size. Hence, for the 32 pt by 32 pt grid of FIG. 8, the $2^{nd}$ Stage Searching Area 810 can be a 64 pt by 64 pt region that is centered on the location (168,72) 808. Accordingly, a similar procedure can be implemented to find the location of a minimal Power Estimate in the $2^{nd}$ Stage Searching Area 810 to obtain more precise calibration settings.

Figure 9:
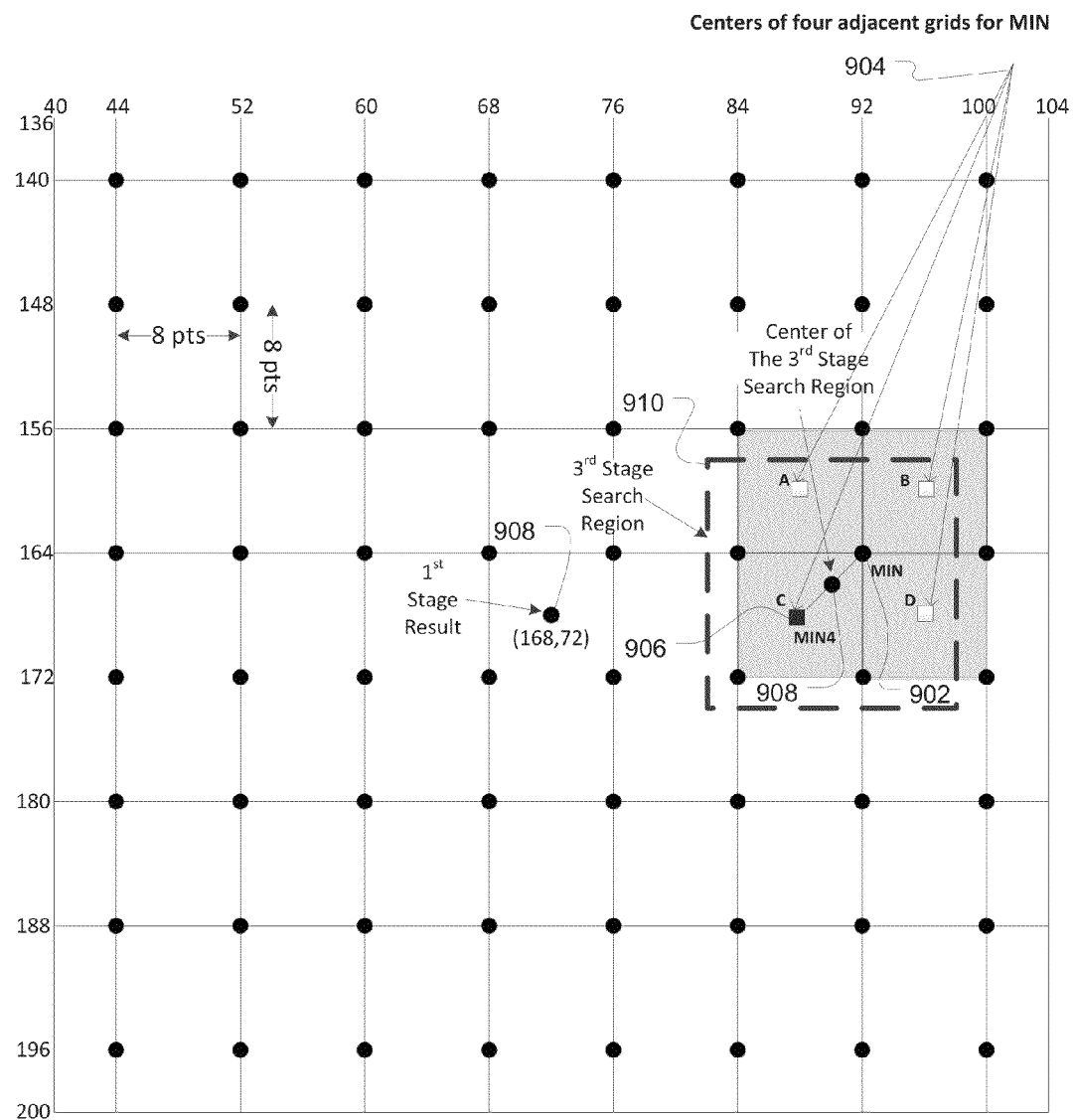
FIG. 9 illustrates a $2^{nd}$ Stage Searching Area representing Gain Imbalance and Phase Imbalance in a search algorithm, in accordance with various embodiments.

FIG. 9 illustrates a $2^{nd}$ Stage Searching Area representing Gain Imbalance and Phase Imbalance in a search algorithm, in accordance with various embodiments. The region in FIG. 9 can depict the $2^{n}$ Stage Searching Area 810 produced in the example of FIG. 8. Accordingly, the region in FIG. 9 is a 64 pt by 64 pt space centered on the location (168,72) 808, 908 derived in the example of FIG. 8. A series of grid-points can be plotted in the two-dimensional space at predetermined intervals. In the example of FIG. 9 the search space is divided into 8 point by 8 point grids to produce an 8×8 array of grid-points. The Power Estimate can be obtained at each grid-point and compared to find the grid-point with the minimum Power Estimate. For example, in FIG. 9, a minimum Power Estimate grid-point (MIN) 902 at the coordinates (92, 164) can correspond to the lowest measured Power Estimate among the plotted grid-points. The coordinates of the MIN grid-point 902 can be saved and can be the first guess for the center of a next searching stage. The MIN grid-point 902 has four adjacent grids (shaded in gray); the centers of the four adjacent grids are labeled A, B, C, and D (Centers of four adjacent grids for MIN) 904. A prediction of the Power Estimate at the centers of the four grids A, B, C, and D 904 can be obtained by interpolating the Power Estimates at the four grid-points on the corners of each grid. For example, the Power Estimates at the four corner grid-points of each of the four adjacent grids can be averaged to obtain a prediction of the Power Estimate value for each center point A, B, C, and D 904. The predicted Power Estimates at the center points A, B, C, and D 904 can be compared and the coordinates of the center point with lowest predicted Power Estimate can be saved as the second guess for the center of the next searching stage, we can call this point MIN4. For example, in the example of FIG. 9, the center point with the lowest predicted Power Estimate of the center points A, B, C, and D 904 can be the point C (MIN4) 906. Further, the coordinates of MIN 902 and the coordinates of MIN4 906 can be averaged and the resulting location 908, in this case at (166,90), can be used as the center of the $3^{rd}$ Stage Searching Area 910. Accordingly, a similar procedure can be implemented to find the location of a minimal Power Estimate in the $3^{rd}$ Stage Searching Area 910 to obtain more precise calibration settings.

In various embodiments, the process of searching in subsequent searching areas can continue until sufficiently accurate calibration settings are obtained; until the grid size in a searching area is a certain value, such as one; or until another parameter is met. For example, in an embodiment, if the grid size in a searching area is one, then the MIN point, or the grid-point in the searching area where the lowest Power Estimate is measured, can be used as the optimum point and the corresponding coordinates of the grid-point can indicate the optimal value for Gain imbalance and Phase Imbalance calibration. In an embodiment, if the grid size in a searching region is two, the center of the next searching stage can be the MIN grid-point. Also, in an embodiment, calculating the MIN4 point can be eliminated in searching stages with grid size of one or two and the center of the next searching stage can be the MIN grid-point.

In various embodiments, the Base-Band gain can be set at the beginning of each stage. In an embodiment, the Base-Band gain can be higher in a searching stage than in a previous searching stage. Namely, because grid-points in a given searching stage can correspond to more ideal calibration values than in a previous stage, the overall Power Estimates at the grid-points in the given stage can be lower than the overall Power Estimates at the grid-points in the previous stage. Increasing the Base-Band gain for subsequent stages of the algorithm can maintain Power Estimates within more ideal sensitivity levels of the system components, such as power detectors.

In various embodiments, to achieve stability in convergence, the size of the searching area in a searching stage can be smaller than the size of the searching area in the previous searching stage (except first stage). For example, the size of the searching area in a searching stage can be twice the grid size used in the previous searching stage, as illustrated in the example of FIG. 8. To achieve faster convergence, the size of the searching area can be reduced to, for example, half of the grid size used in the previous searching stage. Further, the number of gridded points can be fixed during the different stages, except for the last stages where the algorithm can be limited when minimum grid size is reached.

Figure 10:
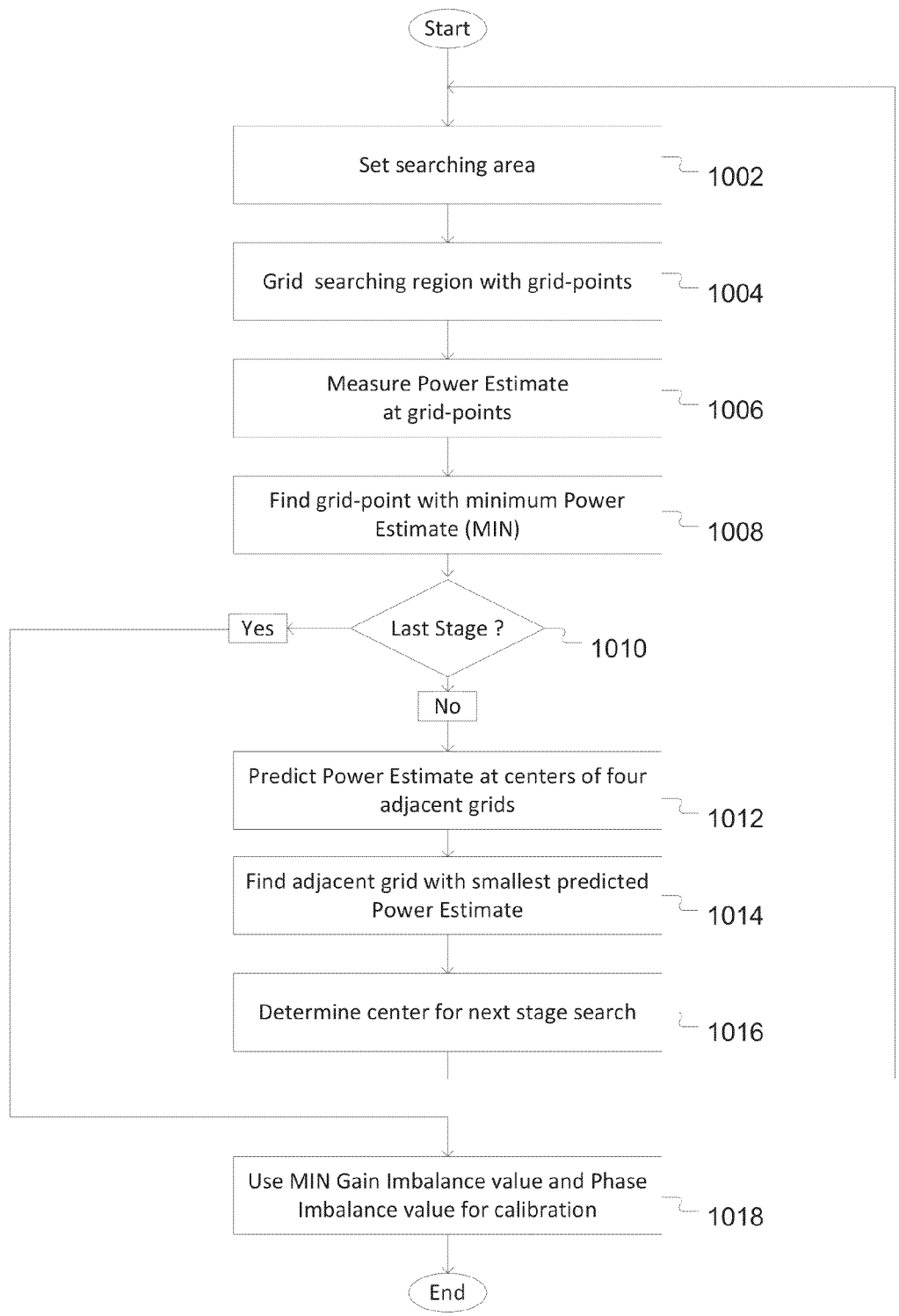
FIG. 10 illustrates an example process flow of a searching algorithm, such as the algorithm described in FIG. 8 and FIG. 9, in accordance with various embodiments.

FIG. 10 illustrates an example process flow of a searching algorithm, such as the algorithm described in FIG. 8 and FIG. 9, in accordance with various embodiments. A searching area can be set 1002. In the first searching stage of the algorithm, the searching area can be a two-dimensional space, with Gain Imbalance values on one axis and Phase Imbalance values on the other axis, where the two-dimensional space can cover all possibly desirable values of Gain Imbalance adjustment and Phase Imbalance adjustment in the system. In subsequent searching stages, the searching area can be a subset of the previous searching area, where the center of the searching area in the subsequent searching stage is determined in the previous searching stage. The searching area can be gridded with searching grid-points 1004. The searching area can be gridded by dividing the searching region into grids of a predetermined size, for example, the searching region can be divided into a grid to produce an 8 by 8 array of grid-points. A Power Estimate can be measured at each grid-point 1006 by producing Gain and Phase adjustments in the receiver corresponding to the coordinates of the grid-point and measuring the power of the signal produced in the receiver from a mirror frequency Test Signal conveyed to the receiver. The Power Estimate at each grid-point can be compared to find the grid-point with the minimum Power Estimate (MIN) 1008. A decision can be made as to whether the last stage of the algorithm has been reached 1010. For example, if the minimum grid size available in the system was used in the searching stage, the decision 1010 can be made that the last stage has been reached. If the last stage has been reached, the most recent Gain Imbalance value and Phase Imbalance values corresponding to the MIN grid-point can be used to calibrate the system 1018. If the last stage has not been reached, then the Power Estimate at the centers of the four adjacent squares to the MIN grid-point can be predicted 1012. For example, the Power Estimates at the corners of each of the four adjacent grids can be averaged to predict the Power Estimate at the center of the adjacent grid. The predicted Power Estimates at the centers of the four adjacent grids can be compared to find the adjacent grid with the smallest predicted Power Estimate 1014. The center for the next stage search can be determined based on the coordinates of the most recent MIN grid-point and the coordinates of the center of the adjacent grid with the smallest predicted Power Estimate 1016. For example, the center for the next stage search can be the average of the coordinates of the most recent MIN grid-point and the coordinates of the center of the adjacent grid with the smallest predicted Power Estimate. A subsequent searching area can be set 1002 centered on the determined center.

The various embodiments of the invention may also involve a number of functions to be performed by a computer processor, such as a microprocessor. The microprocessor may be a specialized or dedicated microprocessor that is configured to perform particular tasks according to the embodiments by executing machine-readable software code that defines the particular tasks described herein. The microprocessor may also be configured to operate and communicate with other devices such as direct memory access modules, memory storage devices, Internet related hardware, and other devices that relate to the transmission of data in accordance with the embodiments of the invention. The software code may be configured using software formats such as Java, C++, XML (Extensible Mark-up Language) and other languages that may be used to define functions that relate to operations of devices required to carry out the functional operations related to the embodiments of the invention. The code may be written in different forms and styles, many of which are known to those skilled in the art. Different code formats, code configurations, styles, and forms of software programs and other means of configuring code to define the operations of a microprocessor in accordance with the embodiments of the invention will not depart from the spirit and scope of the invention.

Within the different types of devices, such as computers, laptops, cell phones, PDAs, mobile televisions, personal navigation devices, personal media players or other devices that can utilize the embodiments of the invention, there can exist different types of memory components for storing and retrieving information while performing functions according to the embodiments. Cache memory devices can be included in such devices for use by a central processing unit as a convenient storage location for information that is frequently stored and retrieved. Similarly, a persistent memory can be used with such devices for maintaining information that is frequently retrieved by the central processing unit, but that is not often altered within the persistent memory, unlike the cache memory. Main memory can also be included for storing and retrieving larger amounts of information such as data and software applications configured to perform functions according to the various embodiments when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the embodiments of the invention as described herein enable the physical transformation of these memory devices. Accordingly, the embodiments described herein are directed to novel and useful systems and methods that, in one or more embodiments, are able to transform the memory device into a different state. The invention is not limited to any particular type of memory device, or any commonly used protocol for storing and retrieving information to and from these memory devices, respectively.

Further, within the different types of devices, such as computers, laptops, cell phones, PDAs, mobile televisions, personal navigation devices, personal media players or other devices that utilize the embodiments of the invention, there can exist different types of interface components for conveying and displaying information while performing functions described herein. Visual displays such as LCDs and audio devices such as speakers can be included in such devices to display information contained in a received signal in audio and/or visual format while performing functions of the various embodiments. During operation, these components are transformed into different states to display various graphical images or to vibrate at various frequencies in order to convey images and sounds to the user. Thus, systems and methods configured according to the embodiments described herein can enable the physical transformation of these interface components. Further, systems and methods configured according to the embodiments of the invention can enable the transformation of a machine-readable medium, such as a carrier signal, into a different state, such as an image or a sound wave. Accordingly, the novel and useful systems and methods described herein allow, in one or more embodiments, transformation of the interface components into a different state and transformation of a received signal into a different state. The invention is not limited to any particular type of interface component or received signal, or any commonly used protocol for applying such components and signals.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," "various embodiments" or "other embodiments" means that a particular feature, structure, or characteristic described in connection with the embodiments is included in at least some embodiments, but not necessarily all embodiments. References to "an embodiment," "one embodiment," or "some embodiments" are not necessarily all referring to the same embodiments. If the specification states a component, feature, structure, or characteristic "may," "can," "might," or "could" be included, that particular component, feature, structure, or characteristic is not required to be included. If the specification or Claim refers to "a" or "an" element, that does not mean there is only one of the element. If the specification or claims refer to an "additional" element, that does not preclude there being more than one of the additional element.

The invention claimed is:

1. A system comprising:
a low-IF receiver configured to be tunable for selected channels;
a synthesizer configured to produce a Test Signal in mirror frequencies for a selected channel and for conveying the Test Signal to the receiver; and
an IQ Imbalance Estimator configured for estimating a phase imbalance and a gain imbalance in the receiver based on a signal produced in the receiver from the Test Signal;
wherein the system is further configured for:
setting a first searching region for gain imbalance and phase imbalance in the receiver, wherein the first searching region is a two-dimensional space defined by gain imbalance values on a gain axis and phase imbalance values on a phase axis;
selecting a first plurality of grid-points within the first searching region; and
measuring a Power Estimate for each grid-point in the first plurality of grid-points by setting a gain-correction and a phase-correction in the receiver corresponding to the coordinates of each grid-point in the first plurality of grid-points and measuring the Power Estimate of the signal produced in the receiver from the conveyed mirror-frequency signal for each grid-point in the first plurality of grid-points.

2. The system of claim 1, wherein the system is further configured for:
setting a second searching region within the first searching region, wherein the second searching region is a subset of the first searching region, and wherein the location of the second searching region is based on the measured Power Estimates for grid-points in the first plurality of grid-points;
selecting a second plurality of grid-points within the second searching region; and
measuring a Power Estimate for each grid-point in the second plurality of grid-points by setting a gain-correction and a phase-correction in the receiver corresponding to the coordinates of each grid-point in the second plurality of grid-points and measuring the Power Estimate of the signal produced in the receiver from the conveyed minor-frequency signal for each grid-point in the second plurality of grid-points.

3. The system of claim 2, wherein the system is further configured such that the location of the second searching region within the first searching region is selected based on at least a location of a minimum-power grid-point, wherein the minimum-power grid-point is a grid-point in the first plurality of grid points with the smallest measured Power Estimate.

4. The system of claim 2, wherein the system is further configured such that selecting the location of the second searching region within the first searching region further comprises:
estimating a power at the center of each grid adjacent to the minimum-power grid-point by averaging the power at the four corner grid-points of each of the adjacent grids;
setting the center of the second searching region to be the average of the coordinates of the minimum-power grid-point and the coordinates of the center of the grid with the smallest estimated power at the center.

5. A method comprising:
selecting a channel in a low-IF receiver;
producing a Test Signal in minor frequencies for the selected channel;
conveying the Test Signal to the receiver;
estimating a phase imbalance and a gain imbalance in the receiver based on a signal produced in the receiver from the Test Signal;
selecting a first set of combinations of phase imbalance values and gain imbalance values;
measuring a Power Estimate for each combination in the first set of combinations of phase imbalance values and gain imbalance values;
selecting a first ideal combination in the first set of combinations, where the first ideal combination is a combination producing the lowest Power Estimate in the first set of combinations;
selecting a second set of combinations of phase imbalance values and gain imbalance values, wherein the second set of combinations is based on the first ideal combination;
measuring a Power Estimate for each combination in the second set of combinations of phase imbalance values and gain imbalance values;
selecting a second ideal combination in the second set of combinations, where the second ideal combination is a combination producing the lowest Power Estimate in the second set of combinations.

6. A method comprising:
selecting a channel in a low-IF receiver;
producing a Test Signal in minor frequencies for the selected channel;
conveying the Test Signal to the receiver;
estimating a phase imbalance and a gain imbalance in the receiver based on a signal produced in the receiver from the Test Signal;

setting a first searching region for gain imbalance and phase imbalance in the receiver, wherein the first searching region is a two-dimensional space defined by gain imbalance values on a in axis and phase imbalance values on a phase axis;

selecting a first plurality of grid-points within the first searching region; and measuring a Power Estimate for each grid-point in the first plurality of grid-points by setting a gain-correction and a phase-correction in the receiver corresponding to the coordinates of each grid-point in the first plurality of grid-points and measuring the Power Estimate of the signal produced in the receiver from the conveyed minor-frequency signal for each grid-point in the first plurality of grid-points.

7. The method of claim 6, further comprising:

setting a second searching region within the first searching region, wherein the second searching region is a subset of the first searching region, and wherein the location of the second searching region is based on the measured Power Estimates for grid-points in the first plurality of grid-points;

selecting a second plurality of grid-points within the second searching region; and measuring a Power Estimate for each grid-point in the second plurality of grid-points by setting a gain-correction and a phase-correction in the receiver corresponding to the coordinates of each grid-point in the second plurality of grid-points and measuring the Power Estimate of the signal produced in the receiver from the conveyed minor-frequency signal for each grid-point in the second plurality of grid-points.

8. The method of claim 7, further comprising:

selecting the location of the second searching region within the first searching region based on at least a location of a minimum-power grid-point, wherein the minimum-power grid-point is a grid-point in the first plurality of grid points with the smallest measured Power Estimate.

9. The method of claim 7, wherein selecting the location of the second searching region within the first searching region further comprises:

estimating a power at the center of each grid adjacent to the minimum-power grid-point by averaging the power at the four corner grid-points of each of the adjacent grids;

setting the center of the second searching region to be the average of the coordinates of the minimum-power grid-point and the coordinates of the center of the grid with the smallest estimated power at the center.

10. The method of claim 7, further comprising:

varying the gain in the baseband section of the receiver such that the level of gain when measuring the Power Estimate for the first plurality of grid-points is lower than the level of gain when measuring the Power Estimate for the second plurality of grid-points.

11. An apparatus comprising:

a low-IF receiver configured to be tunable for selected channels;

a synthesizer configured to produce a Test Signal in mirror frequencies for a selected channel and for conveying the Test Signal to the receiver;

a power detector configured to produce a Power Estimate of the signal produced in the receiver from the conveyed Test Signal;

an IQ Imbalance Estimator configured for estimating a phase imbalance and a gain imbalance in the receiver based on the Power Estimate; and, an IQ Imbalance Compensator configured for adjusting the difference in the gain and the phase between the I channel and the Q channel in the receiver based on the estimated gain imbalance and the estimated phase imbalance;

wherein the apparatus is further configured for:

setting a first searching region for gain imbalance and phase imbalance in the receiver, wherein the first searching region is a two-dimensional space defined by gain imbalance values on a gain axis and phase imbalance values on a phase axis;

selecting a first plurality of grid-points within the first searching region; and measuring a Power Estimate for each grid-point in the first plurality of grid-points by setting a gain-correction and a phase-correction in the receiver corresponding to the coordinates of each grid-point in the first plurality of grid-points and measuring the Power Estimate of the signal produced in the receiver from the conveyed minor-frequency signal for each grid-point in the first plurality of grid-points.

12. The apparatus of claim 11, wherein the apparatus is further configured for:

setting a second searching region within the first searching region, wherein the second searching region is a subset of the first searching region, and wherein the location of the second searching region is based on the measured Power Estimates for grid-points in the first plurality of grid-points;

selecting a second plurality of grid-points within the second searching region; and measuring a Power Estimate for each grid-point in the second plurality of grid-points by setting a gain-correction and a phase-correction in the receiver corresponding to the coordinates of each grid-point in the second plurality of grid-points and measuring the Power Estimate of the signal produced in the receiver from the conveyed minor-frequency signal for each grid-point in the second plurality of grid-points.

13. The apparatus of claim 11, wherein the apparatus is further configured such that the location of the second searching region within the first searching region is selected based on at least a location of a minimum-power grid-point, wherein the minimum-power grid-point is a grid-point in the first plurality of grid points with the smallest measured Power Estimate.

14. The system of claim 1, further comprising:

a power detector configured to produce the Power Estimate of the signal produced in the receiver from the conveyed Test Signal, wherein the IQ Imbalance Estimator is further configured to estimate the phase imbalance and the gain imbalance in the receiver based on the Power Estimate.

15. The system of claim 1, further comprising:

an IQ Imbalance Compensator configured for adjusting the difference in the gain and the phase between the I channel and the Q channel the receiver based on the estimated gain imbalance and the estimated phase imbalance.

16. The method of claim 5, wherein the Test Signal is a single-tone signal in a mirror frequency.

* * * * *

UNITED STATES PATENT AND TRADEMARK OFFICE
CERTIFICATE OF CORRECTION

PATENT NO. : 8,503,576 B2  Page 1 of 1
APPLICATION NO. : 13/093145
DATED : August 6, 2013
INVENTOR(S) : Saeid Mehrmanesh It is certified that error appears in the above-identified patent and that said Letters Patent is hereby corrected as shown below:

In the Claims:

Claim 2, column 16, line 12, please delete "minor" and insert --mirror--

Claim 5, column 16, line 33, please delete "minor" and insert --mirror--

Claim 6, column 16, line 61, please delete "minor" and insert --mirror--

Claim 6, column 17, line 14, please delete "minor" and insert --mirror--

Claim 7, column 17, line 31, please delete "minor" and insert --mirror--

Claim 11, column 18, line 23, please delete "minor" and insert --mirror--

Claim 12, column 18, line 41, please delete "minor" and insert --mirror--

Signed and Sealed this
Twenty-seventh Day of May, 2014

Michelle K. Lee
*Deputy Director of the United States Patent and Trademark Office*